G. C. SCHNEIDER.
Bee Hive.
No. 82,880.
Patented Oct. 6, 1868.
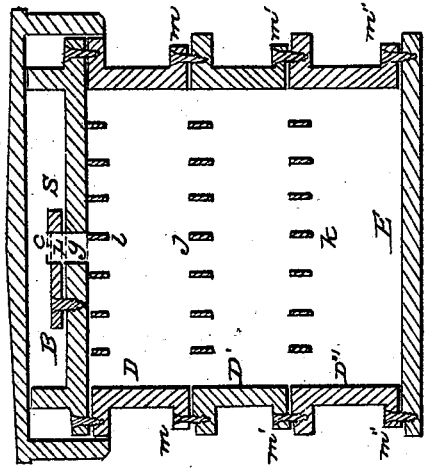
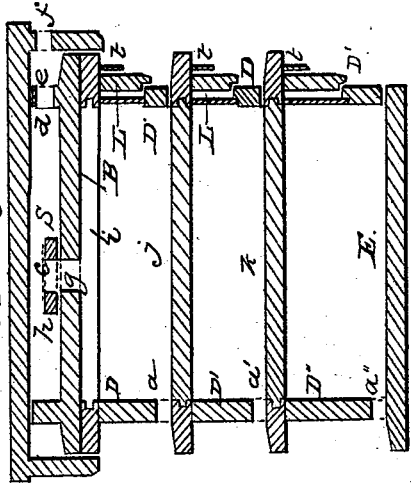
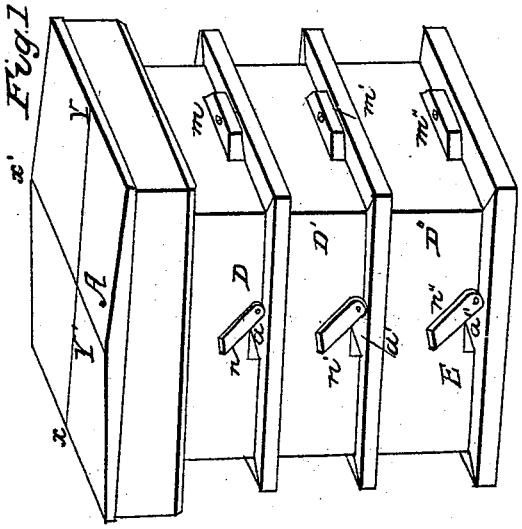
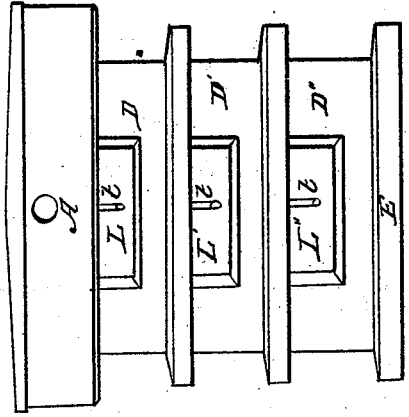

United States Patent Office.

GEORGE C. SCHNEIDER, OF ADRIAN, MICHIGAN.

Letters Patent No. 82,880, dated October 6, 1868.

IMPROVEMENT IN BEE-HIVES.

The Schedule referred to in these Letters Patent and making part of the same.

TO ALL WHOM IT MAY CONCERN:

Be it known that I, GEORGE C. SCHNEIDER, of Adrian, in the county of Lenawee, and State of Michigan, have invented a new and useful Improvement in Bee-Hives; and I do hereby declare the following to be a full, clear, and exact description of the same, reference being had to the accompanying drawing, making a part of this specification, and to the letters of reference marked thereon.

The nature of my invention consists in the novel construction of a bee-hive, composed of several similar horizontal sections, placed one above the other, so that as soon as the upper section is filled with honey, it may, if desired, be removed from the top, emptied of its contents, and then (the remaining sections being together lifted from the bottom board) may be placed under the other sections, thus restoring the hive to its original height; and when the now upper section is also filled with honey, it may, in like manner, be removed, emptied, and placed under the section previously removed, and so on, indefinitely removing each time the upper section, and placing it at the bottom; or, if desirable, new sections may be added, either at the top or bottom, at any time, and thus the hive may be made larger or smaller, to accommodate any size of swarm. These several sections constitute the body of the hive.

In the drawings—

Figure 1 represents a perspective view of such a bee-hive, composed of several (three) sections, with base-board and cap, all placed in proper positions for use.

Figure 2 represents a view of the rear of the hive.

Figure 3 represents a plain section passing through the line $x\,y$ in fig. 1.

Figure 4 represents a transverse section passing through the line $x'\,y'$ in fig. 1.

A represents a hollow cap.

B represents a feed-box.

D, D', and D'' represent similar sections.

E represents the base-board of the hive.

The bottom of the feed-box B forms the top or cover of the hive, and between it and the cap A is formed an opening, S, which serves both as an air-chamber and as a place to feed the bees when it shall become necessary, or to deposit any suitable substances for absorbing moisture.

$h$ is a small movable lid, for covering the passage $g$, between the interior of the hive and the opening S, and by means of which the passage $g$ may be closed up altogether, so as to promote breeding, or it may be so turned as to allow of ventilation, or it may be moved aside, so as to allow the bees to pass up into the opening S.

$c$ and $d$ are fine screens, to admit the air and prevent the ingress of insects.

By removing the window-blinds L, L', and L'', a full view may at any time be had of the working of the bees and of the fulness of the hive. And it is designed to raise the hive and place additional sections under it, as often as additional space shall be required, or one or more of the upper sections of the hive may be removed as soon as it is proper to abstract the honey.

Each section has several slats, $i, j, k$, &c., across it, at the top, to help support the comb, and at the bottom of each section the fly-holes $a, a'$, and $a''$ are made, to admit the bees to the interior of the hive.

From the manner of constructing my improved bee-hive, it will be readily seen that with one hollow cap, A, one feed-box, B, one base-board, E, and a repetition of the section D, a bee-hive may be quickly set up, of any size, varying according to the size of the swarm of bees that are to occupy it.

Having thus described my invention, what I claim as new, and desire to secure by Letters Patent, is—

A bee-hive, constructed of three or more similar interchangeable sections, D, D', and D'', &c., in combination with the hollow cap A, feed-box B, opening S, and small movable lid $h$, the whole constructed and operating in the manner and for the purposes set forth and described.

G. C. SCHNEIDER.

Witnesses:
W. M. GADLEY,
F. GAYLORD.